United States Patent
Hogendoorn

(10) Patent No.: US 7,409,368 B2
(45) Date of Patent: Aug. 5, 2008

(54) DUTCH AUCTION SYSTEM WITH PREREGISTERED BID FEATURE

(75) Inventor: Paul Hogendoorn, London (CA)

(73) Assignee: OES, Inc., London, Ontario (CA)

( * ) Notice: Subject to any disclaimer, the term of this patent is extended or adjusted under 35 U.S.C. 154(b) by 1537 days.

(21) Appl. No.: 09/862,800

(22) Filed: May 21, 2001

(65) Prior Publication Data

US 2002/0007339 A1 Jan. 17, 2002

Related U.S. Application Data

(60) Provisional application No. 60/217,946, filed on Jul. 13, 2000.

(51) Int. Cl.
*G06Q 40/00* (2006.01)
(52) U.S. Cl. ........................................ 705/37
(58) Field of Classification Search .............. 705/37, 705/26, 27; 713/400, 401
See application file for complete search history.

(56) References Cited

U.S. PATENT DOCUMENTS

| | | | | | |
|---|---|---|---|---|---|
| 5,867,564 | A | * | 2/1999 | Bhusri | 379/111 |
| 5,890,138 | A | * | 3/1999 | Godin | 705/26 |
| 6,012,045 | A | * | 1/2000 | Barzilai | 705/37 |
| 6,044,363 | A | * | 3/2000 | Mori | 705/37 |
| 6,167,386 | A | * | 12/2000 | Brown | 705/37 |
| 6,243,691 | B1 | * | 6/2001 | Fisher | 705/37 |
| 6,449,601 | B1 | * | 9/2002 | Friedland | 705/37 |
| 6,553,504 | B1 | * | 4/2003 | Katzenelson et al. | 713/401 |
| 2002/0069076 | A1 | * | 6/2002 | Faris et al. | 705/1 |
| 2002/0087456 | A1 | * | 7/2002 | Abeshouse et al. | 705/37 |
| 2002/0165817 | A1 | * | 11/2002 | Rackson et al. | 705/37 |

FOREIGN PATENT DOCUMENTS

| | | |
|---|---|---|
| EP | 0 628 920 A1 | 12/1994 |
| EP | 0 716 386 A2 | 6/1996 |
| EP | 0 828 223 A2 | 3/1998 |
| EP | 0 987 644 A2 | 3/2000 |
| WO | WO 97/22074 | 6/1997 |
| WO | WO 97/37315 | 10/1997 |
| WO | WO 98/26363 | 6/1998 |
| WO | WO 98/38844 | 9/1998 |

OTHER PUBLICATIONS

Rockoff, T.E.; Groves, M. "Design of an Internet-based system for remote Dutch auction", Dept. of Computer Science, Flinders Univ., Journal: Internet Research vol. 5, No. 4 p. 10-16, 1995.*

* cited by examiner

*Primary Examiner*—Hani M. Kazimi
(74) *Attorney, Agent, or Firm*—Carlson, Gaskey & Olds

(57) ABSTRACT

A descending bid auction system includes preregistered bids from remote locations. Preregistered bids submitted before an auction cycle begins are awarded a sale when the pricing device declines to a price that matches that of the preregistered bid. In keeping with traditional Dutch auction style, in one example, local bidders who submit a bid are given priority because of the first-submitted tradition. Similarly, when more than one remotely submitted preregistered bid is for the same price, the first such bid submitted is given priority. An alternative way of using a remote bidding terminal designed according to this invention is to competitively bid while an auction cycle is in process. Bids submitted while the auction cycle is in process preferably are submitted when a remote clock, which operates in advance compared to the auction site clock, reaches a desired price. the remote bid preferably is received at the auction site before the auction site clock reaches the intended price.

9 Claims, 2 Drawing Sheets

DUTCH AUCTION SYSTEM WITH PREREGISTERED BID FEATURE

CROSS REFERENCE TO RELATED APPLICATIONS

This application claims priority to U.S. Provisional Application No. 60/217,946, which was filed on Jul. 13, 2000.

FIELD OF THE INVENTION

This invention generally relates to descending price auction systems. More particularly, this invention relates to a descending price auction system enabling potential buyers to preregister bids from a remote location.

BACKGROUND OF THE INVENTION

There are a variety of styles of auctions. "Dutch auctions" are the type where a price continues to go down until a buyer is determined. These types of auctions are also referred to as "descending bid auctions."

Dutch auctions typically include a Dutch clock device that shows the sequentially descending price. Local potential buyers watch the price on the Dutch clock and submit a bid for a price responsive to the clock reaching that price. State of the art systems include bidding devices that identify buyers and enable them to submit a bid including information regarding the amount of the product that they desire to purchase.

According to current standards, there are several ways for the Dutch clock to be stopped during an auction cycle. First, when a buyer indicates a desire to purchase some of the currently offered items at the current price, the clock is stopped and the sale is awarded accordingly. Alternatively, a seller may stop the auction cycle or the auctioneer may stop the auction cycle according to rules established at the various auctions. Other ways that the clock stops includes the price declining to a preselected minimum price, which may be zero or greater, depending on the situation.

One hindrance to the success of Dutch auctions is the perceived aggressive and intimidating environment of the auction. At declining bid auctions, decisions are made in fractions of a second and are completely binding. During busy seasons there is an additional sense of stress and tension at the auction gallery. The very competitive nature of the marketplace, the speed and size of the auction, and the experience of most of the potential buyers frequently intimidates new or inexperienced auction buyers. Additionally, the nature of the Dutch clock device makes any mistakes (i.e., a bid at too high of a price) very public, which presents a humiliation factor to some that is enough to discourage them from attending the auction.

Another drawback of current Dutch auction systems is the inconvenience of having to attend the auction at the auction site. Additionally, the auctions of agricultural products typically start very early in the morning and the typical buyers are located far from the auction site so that significant travel inconvenience is a factor.

With advances in technology, Dutch auctions have been conducted with potential buyers being located at remote locations from the location of the auction clock and the item to be purchased. Such systems, however, present a disadvantage to the remote buyers because the awarded sale in a Dutch auction is typically given to the first bid received at a given price. Therefore, any communication delay from a remote location may result in a potential buyer losing out to a local bidder who is present at the auction site. Additionally, remote buyers may not get an expected price because the price can typically decrement by a selected unit of currency every forty milliseconds. A one-tenth second delay may result in a significant price disadvantage.

There have been attempts at addressing the disadvantage to remote buyers such as allowing the remote buyer to submit the intended price along with the clock stop command. While these methods have not proven completely satisfactory, they have at least enabled remote buyers to participate in declining price auctions. Other attempts have been made to address the situation of remote buyers in auction cycles, however, these do not appear to be sufficient to address the needs of a declining or descending price auction style. One example is shown in the European patent publication EP 0828223. In that document, a series of decision-making rules are applied to various bids in order to sort through the bids and award a sale to a single buyer when there are competing bids that may conflict based upon time or amount, for example. The decision-making rules of that proposed system, however, do not appear useful in a descending price auction where the sale is typically awarded to the first buyer to submit a bid.

There is a need for a Dutch auction system that allows buyers to compete from a remote location to avoid the tension and stresses associated with being at the live auction while not handicapping the remote buyers because of communication delays as described above. This invention provides such a system and enhances the Dutch auction process.

SUMMARY OF THE INVENTION

In general terms, this invention is a Dutch auction system. A pricing device sequentially decreases the price of an item from a selected starting price during an auction cycle. At least one remote bidding module allows a potential buyer to preregister a remote bid at a selected price before the actual auction clock reaches that price. A bid processor module determines whether the pricing device reaches a price that is equal to the amount of the preregistered bid. When the price on the pricing device equals the amount of the preregistered bid, the sale is awarded to the remote, preregistered buyer.

In the preferred embodiment, a local bidder that submits a bid at a price that is equal to a preregistered bid, wins out over the preregistered buyer. This is intended to keep with the traditional Dutch auction style of awarding the sale to the first bidder. Similarly, when more than one preregistered bid is received for the same price, the first such bid that was received is given priority and will be awarded the sale should the pricing device decline to the preregistered bid price.

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
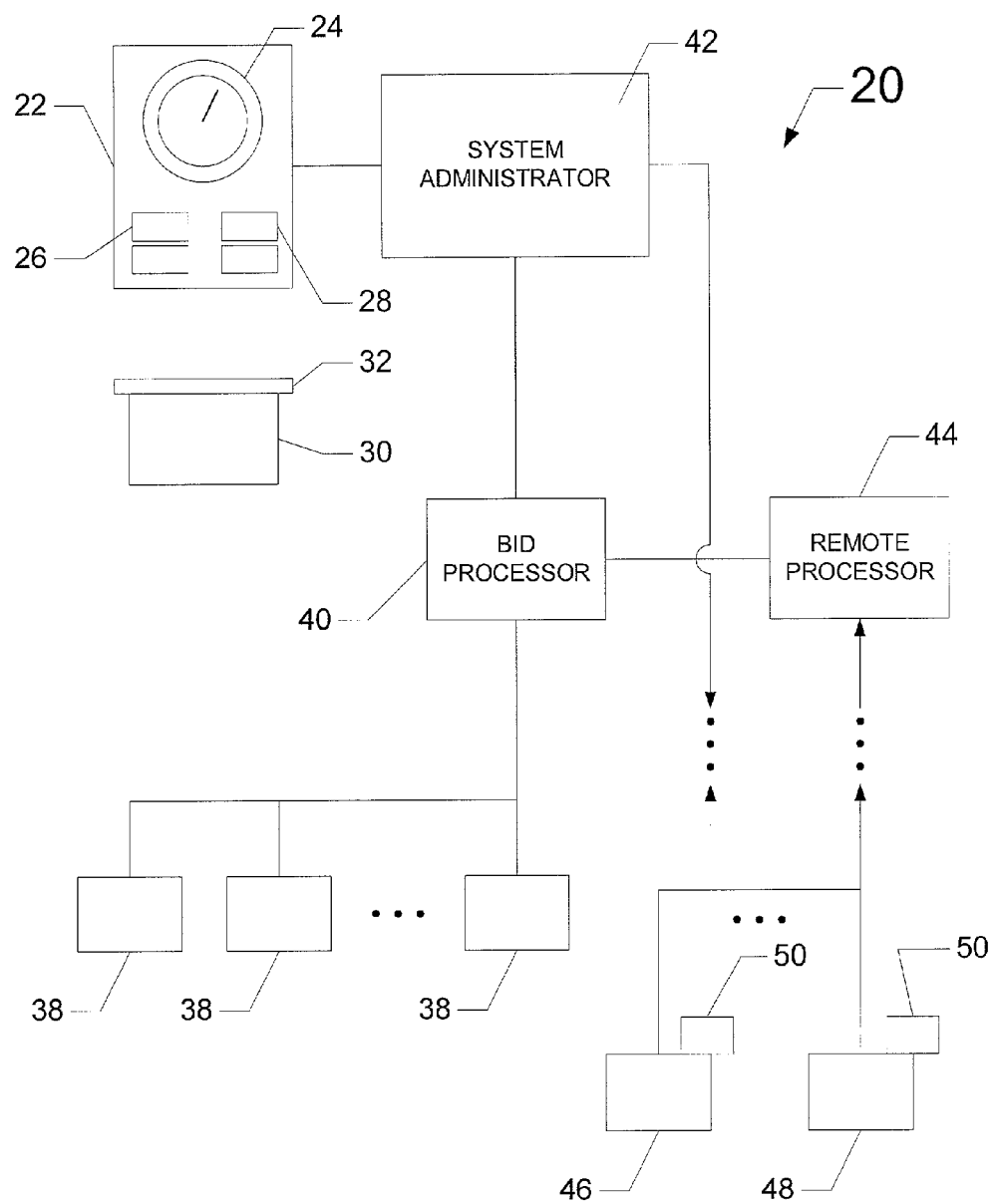
FIG. 1 schematically illustrates a descending price auction system designed according to this invention.

A descending price auction system 20 includes a pricing device 22 that preferably is a Dutch auction clock. A pricing indicator 24 provides a visual indicator to local potential buyers of the descending price over time. Various indicators on the pricing device include a buyer identifier 26 and an amount of product identifier 28. Other indicators may be provided on the pricing device 22, which are visible to those in attendance at the auction.

A product display 30 allows individuals present at the auction to view at least one item 32 that is being auctioned at a given time. The functions of the pricing device 20 and the product display 30 are well known in the art.

Potential buyers at the auction site use bidding devices 38 to communicate a desire to purchase some amount of a currently auctioned product when the pricing device 22 reaches a price at which they desire to make a purchase. The bids from the local bidding devices 38 are processed by a bid processor module 40. A system administrator 42 provides the information to the displays 26 and 28, for example, indicating the results of a bid received by the bid processor 40. The bidding devices 38 are utilized in a known manner by local bidders to purchase items being auctioned.

The system 20 also includes a remote bidding processor 44 that receives and handles preregistered bids submitted by remotely located potential buyers. A plurality of remote bidding devices 46 and 48 enable the remotely located potential buyers to submit bids to be considered during the descending price auction. In one example, the bids submitted remotely must be preregistered in order to be considered during an auction cycle. Preregistration in this example includes providing the selected purchase price prior to the beginning of the auction cycle. A variety of timing considerations can be implemented to facilitate adequate handling of preregistered bids, such as requiring some minimum amount of time between bid submission and the beginning of an actual auction cycle. Another example of a preregistered bid is one that is received from a remote bidder prior to the auction clock descending to the remote bidder's chosen price. The preferred embodiment accommodates both forms of preregistration of a remotely submitted bid.

Once received, the preregistered bids are handled by the bid processor 40 and the system administrator 44 such that whenever the price on the pricing device 22 reaches or equals the price of a preregistered bid, the preregistered buyer is awarded the sale for the chosen amount. In this manner, a buyer is entitled to participate in the auction process without having the inconvenience and stresses associated with being located at the actual auction site. Moreover, the preregistered potential buyer does not suffer a disadvantage because of communication delays.

In keeping with Dutch auction tradition, one example implementation of this invention gives priority to local bids over preregistered bids. In other words, when the pricing device 22 reaches a price that matches a preregistered bid price and a local bidder submits a price simultaneous with the clock reaching that price, the local bidder is awarded the sale.

In another example, the preregistered bid is given priority and those in attendance at the auction preferably are notified of this possibility.

Additionally, the remote processor 44 preferably determines when a preregistered bid is submitted. In keeping with the traditional Dutch auction (first bid wins) philosophy, when more then one preregistered bid is for the same price, the first-received bid is given priority over any subsequently received bids for the same price. In one example, any subsequent bids for the same price are not entitled to be entered into the auction cycle and the remote bidder is notified through a communication module 50 of that result. In that instance, the remote buyer may submit a new bid to be considered during the auction cycle.

In another example, when more than one remote bid is for the same price, the system administrator 42 or the remote processor 44 determines which of the bids is for a greater quantity and gives priority to that bid. A variety of other ways of handling duplicate or conflicting bids are within the scope of this invention.

Figure 2:
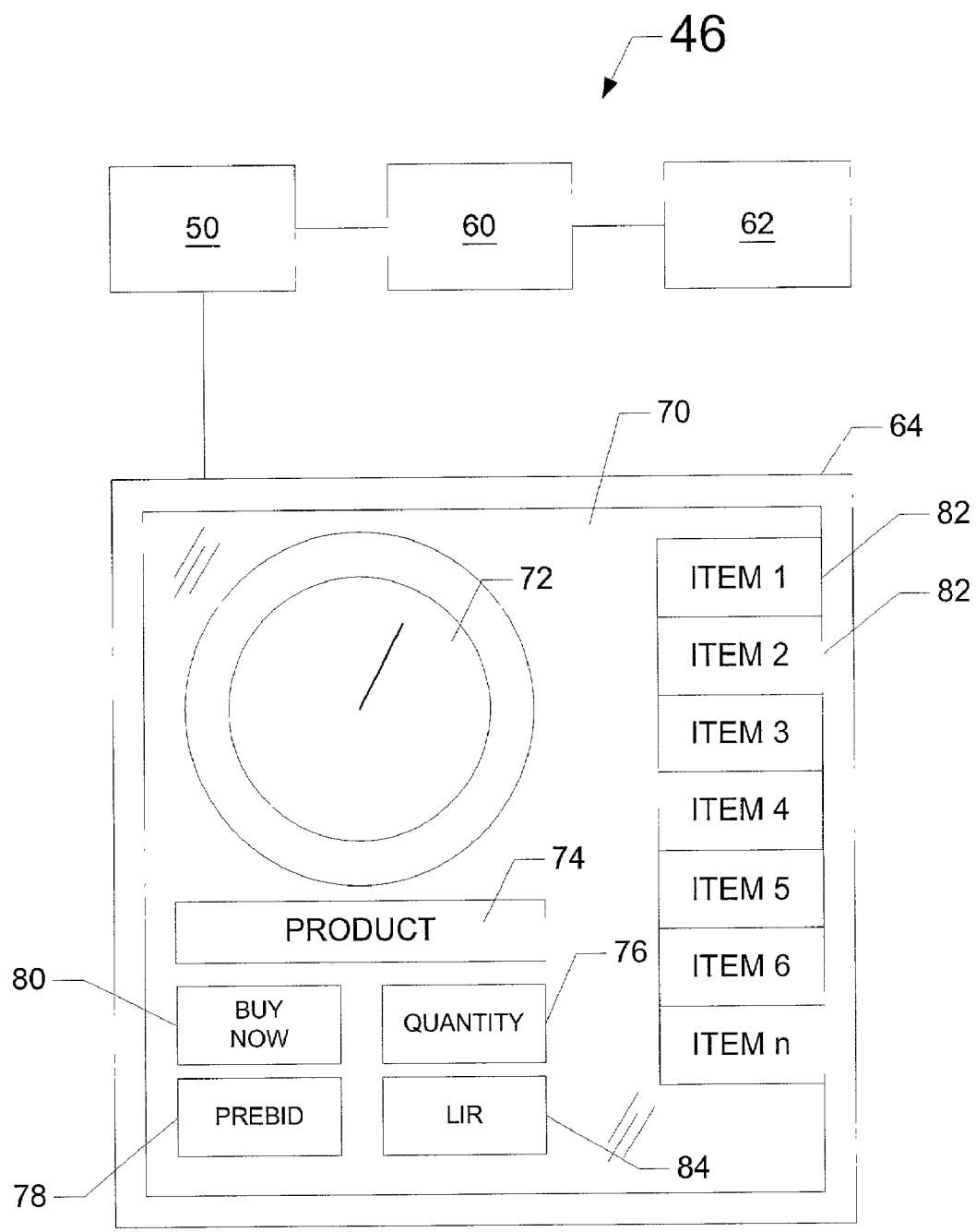
FIG. 2 schematically illustrates a remote bidding device designed according to this invention.

FIG. 2 schematically illustrates one example remote bidding terminal designed according to this invention. The communications module 50 facilitates remote communication between the remote bidding terminal 46 and the remote bid processor 44 or system administrator 42, as the particular communication may require. The communication module 50 preferably provides the remote bidders with information regarding the activities at the auction site, such as current products, current pricing and when a new auction cycle will begin. A clock module 60 preferably controls remote clock functions and facilitates communication of clock information between the system administrator 42 and the remote auction terminal.

The remote auction terminal preferably also includes an accounting module 62 that assists the remote purchaser in tracking budgeting and purchasing information.

The remote auction terminal 46 preferably includes a display device 64 having a display screen 70. The display preferably includes a visible clock 72, which represents the remote auction terminal clock. A product identifier 74 preferably provides visual information regarding a currently auctioned product such as a photograph. In one example, at least a written description of the product is provided.

The display screen may be configured so that a remote purchaser can use a mouse to select functions directly on the screen. Alternatively, a conventional keyboard may be used to generate the appropriate commands depending on the desires of the purchaser at the moment.

The illustrated display includes function buttons on the display that are usable with a mouse pointer or in a touch screen arrangement, for example. A quantity function 76 allows the purchaser to designate the amount of quantity for a particular product that the purchaser wishes to obtain. A prebid function 78 allows the purchaser to preregister the bid before the auction cycle begins as explained above in this description. A buy now option 80 permits the remote bidder to submit a bid during an ongoing auction cycle.

The clock module 60 preferably receives a clock start price, a sweep speed value, a synchronization time stamp and a start delay variable from the system administrator 42, which are typically unique to each auction cycle or site. The clock module 60 preferably controls its own clock swing function and uses the synchronization time stamp and start delay variable to determine when to start the cycle at the remote location. The synchronization time stamp and start delay variable provide the clock module 60 with the necessary information to have the clock at the remote auction terminal swinging slightly ahead of the actual auction clock 24. The synchronization time stamp provided by the system administrator 42 preferably is an absolute time value. The clock module 60 preferably determines its own absolute time value utilizing a rolling average algorithm to determine how much in advance to start the sweep of the remote clock 72 compared to the actual clock 24. The difference in the timing between the two clocks preferably is determined to be as close as possible to a predicted communication delay between the time that a remote buyer chooses to purchase a product and the time the signal is received at the system administrator 42.

This invention recognizes that timing delays are not always exactly predictable. Therefore, the content of information provided by the clock module 60 preferably includes an identification of the clock stop price desired by the remote purchaser. The clock at the remote auction terminal preferably operates slightly ahead of the actual auctioning in an amount of difference that permits the purchase request from the remote auction terminal to be received by the system administrator 42 prior to the actual auction clock 24 reaching the chosen price of the remote purchaser. In this manner, the real time purchase request is received as a preregistered bid by the remote processor 44. In one example, the preregistered bid submitted under the circumstances preferably is received milliseconds before the actual clock 24 reaches the remote purchaser's chosen price.

The display preferably also provides information regarding a plurality of the items or products that will be offered at the auction. Selections 82 can be made to view more detailed information regarding any of the items. In one example, when the product identifier 74 includes a photograph, a corresponding item information choice 82 is highlighted or otherwise correlated to the identifier 74 so that the purchaser can obtain more detailed information as desired.

When a remote purchaser chooses the buy now option 80 and submits a clock stop price during an auction cycle, that bid preferably is treated as a preregistered bid. If a purchaser present at the actual auction site stops the auction clock 24 before the clock reaches the price of the preregistered bid, the local buyer is awarded the purchase.

In the event that the communication delay is such that the purchase price selected by the remote purchaser is higher than the price of the actual auction clock 24 at the time the message is received, the price displayed on the actual auction clock 24 is awarded to the remote purchaser. This provides somewhat of an advantage to a remote purchaser in that they obtain the product as desired at an even lower price than they expected.

In the event that the remote purchaser has attempted to stop the clock at a higher price than a local buyer (i.e., physically present at the auction site) stops the clock, the local purchaser is awarded the sale. This may be perceived as a disadvantage to the remote purchaser, however, when the remote auction terminal is functioning as intended, there should be very minimal occurrences of the latter scenario.

The preferred embodiment includes a function for the remote purchaser to let the current purchase option to continue into the current auction cycle even if the intended bid is not accepted as hoped. This function is shown as a let it ride function 84 on the display 70.

When the function 84 is chosen, the remote purchaser's bid continues on through the auction cycle until the next swing of the clock 24. The remote purchaser preferably has the option of deactivating this function prior to the clock reaching the next price. When the function is active, the auction system preferably retains and automatically reuses the clock stop price submitted by the remote purchaser. In the example where a local purchaser stops the actual clock 24 at a price lower than the remote purchaser's clock stop price, the let it ride function 84 insures that the remote purchaser will be awarded the sale on a subsequent swing of the clock, which in most instances will be the next swing.

A remote auction terminal designed according to this invention preferably includes an ability to display multiple clocks 72 regarding multiple products that are being auctioned. At least one clock display preferably is provided at all times. The accounting module 62 preferably provides information to the remote purchaser regarding their current purchases, total lots and total dollar amounts. The accounting module 62 preferably also tracks preregistered bids that have been entered by the remote purchaser and provides an indication whether these bids have been filed with or accepted by the system administrator 42. The purchaser at the remote location preferably has the option of perusing all items to be auctioned for that day and preregistering bids on any number of the items at any number of prices at the remote purchaser's convenience. The remote auction terminal preferably also facilitates communicating account information to allocate purchases and the appropriate prices in a manner consistent with the particular auction facilitator's practices.

By permitting potential buyers to preregister bids and then awarding a sale to a preregistered bid when the Dutch auction clock reaches a matching price, this invention provides a significant improvement to the Dutch auction process. This invention includes the added benefit of being able to competitively bid during an auction cycle from a remote location. Greater participation with more convenience and less stress is the result.

Although various modules are discussed in this specification, they are intended as distinctive for discussion purposes only. There is no requirement for any physical or software distinction between the various modules as discussed. Moreover, the functions described in association with each module may be performed by a single "module" or by different modules than as described. Those skilled in the art who have the benefit of this description will be able to choose from among commercially available electronic components and/or to develop the necessary software code to realize the results provided by this invention.

The preceding description is exemplary rather than limiting in nature. Variations and modifications to the disclosed embodiments may become apparent to those skilled in the art that do not necessarily depart from the essence of this invention. The scope of legal protection given to this invention can only be determined by studying the following claims.

The invention claimed is:

1. A computer readable medium having a plurality of computer executable instructions for facilitating remote bidding in a declining price auction, comprising:

a communications instruction set that facilitates communication between a remote location and a declining price auction site;

a remote clock instruction set that utilizes information regarding an auction clock at the declining price auction site and determines a desired timing difference between a remote clock and the auction clock at the declining price auction site and controls operation of the remote clock to precede the clock at the declining price auction site; and a bid selector instruction set that allows a remote purchaser to communicate an intention to purchase an item at a selected price.

2. The computer readable medium of claim 1, wherein the remote clock instruction set utilizes a synchronization time stamp provided by the auction site and a start delay variable that is indicative of an expected communication processing delay between the remote location and the auction site.

3. The computer readable medium of claim 1, wherein the communications instruction set facilitates communicating the purchaser's desired purchase price to the auction site prior to a time when the clock at the auction site reaches the desired purchase price.

4. The computer readable medium of claim 1, including a bid carrying instruction set that permits a remote purchaser to have a selected bid be carried over during the auction cycle to a subsequently reached purchase price in the event that a desired purchase price is not accepted at the auction site.

5. A method of facilitating remote bidding in a declining price auction, comprising the steps of:

facilitating communication between a remote location and a declining price auction site;

utilizing information regarding an auction clock at the declining price auction site;

determining a desired timing difference between a remote clock and the auction clock at the declining price auction site;

controlling operation of the remote clock to precede the auction clock at the declining price auction site;

allowing a remote purchaser to communicate an intention to purchase an item at a selected price; and generating at least one signal including information regarding the desired purchase price of the remote purchaser.

6. The method of claim 5, comprising utilizing a synchronization time stamp provided by the auction site and a start delay variable that is indicative of an expected communication processing delay between the remote location and the auction site.

7. The method of claim 5, comprising communicating the purchaser's desired purchase price to the auction site prior to a time when the clock at the auction site reaches the desired purchase price.

8. The method of claim 5, comprising displaying a visual indication of the remote auction clock, information regarding a currently offered product and selectively displaying information regarding other products to be offered at the auction site.

9. The method of claim 5, comprising permitting a remote purchaser to have a selected bid be carried over during the auction cycle to a subsequently reached purchase price in the event that a desired purchase price is not accepted at the auction site.

* * * * *